United States Patent
Rao et al.

(10) Patent No.: US 12,238,134 B1
(45) Date of Patent: Feb. 25, 2025

(54) AUTOMATED DISCOVERY AND EVALUATION OF VULNERABILITY HOTSPOTS IN COMPUTER NETWORKS

(71) Applicant: EYGS LLP, London (GB)

(72) Inventors: Deepak Srinivasa Rao, Chennai (IN); Sathish Babu Namasivayam, Chennai (IN); Jayaprakash Jayavel, Thandalam (IN)

(*) Notice: Subject to any disclaimer, the term of this patent is extended or adjusted under 35 U.S.C. 154(b) by 0 days.

(21) Appl. No.: 18/795,592

(22) Filed: Aug. 6, 2024

(51) Int. Cl.
  *H04L 9/40* (2022.01)

(52) U.S. Cl.
  CPC .................. *H04L 63/1433* (2013.01)

(58) Field of Classification Search
  CPC .................................... H04L 63/1433
  See application file for complete search history.

(56) References Cited

U.S. PATENT DOCUMENTS

| | | | | |
|---|---|---|---|---|
| 2018/0176235 | A1* | 6/2018 | Lam | H04L 63/1425 |
| 2022/0060510 | A1* | 2/2022 | Clayton | H04L 63/1408 |
| 2022/0321595 | A1* | 10/2022 | Colquhoun | H04L 63/1441 |
| 2022/0345477 | A1* | 10/2022 | Criscione | H04L 63/1441 |
| 2022/0345483 | A1* | 10/2022 | Shua | H04L 9/0825 |
| 2023/0031218 | A1* | 2/2023 | Mahdavipour | H04L 67/10 |
| 2023/0229787 | A1* | 7/2023 | Mahdavipour | H04L 63/1433 726/25 |
| 2023/0275917 | A1* | 8/2023 | Karmali | G06F 16/9537 709/224 |
| 2024/0039927 | A1* | 2/2024 | Narayan | H04L 63/145 |
| 2024/0106852 | A1* | 3/2024 | Jeevagunta | H04L 41/22 |

FOREIGN PATENT DOCUMENTS

| | | | |
|---|---|---|---|
| CN | 114500009 | A * | 5/2022 |
| CN | 115514553 | A * | 12/2022 |
| KR | 20210115873 | A * | 9/2021 |

OTHER PUBLICATIONS

Li et al. "A Network Safety Analyzing Method and System Applied to Large Data Intelligent" CN 202210026475A. English translation (Year: 2022).*
Song et al. "A Vulnerability Repairing Method, Device and Medium" CN 202211136443 A. English translation (Year: 2022).*

* cited by examiner

*Primary Examiner* — Sarah Su
(74) *Attorney, Agent, or Firm* — COOLEY LLP (57) ABSTRACT

A non-transitory, processor-readable medium stores instructions that, when executed by a processor, cause the processor to retrieve, from a database associated with a cloud service, first resource configuration data associated with a first resource. The first resource is analyzed to produce first resilience data, and a second resource associated with the cloud service is identified based on an indication of a load balancer associated with the cloud service. Based on the authentication data and an indication of the second resource, a second API call is generated to retrieve, from the database, second resource configuration data associated with the second resource is also retrieved from the database. A second resource is analyzed based on the second resource configuration data to produce second resilience data. Based on the first resilience data and the second resilience data, an indication of a vulnerability hotspot and an indication of a resource mitigation are generated.

20 Claims, 6 Drawing Sheets

AUTOMATED DISCOVERY AND EVALUATION OF VULNERABILITY HOTSPOTS IN COMPUTER NETWORKS

FIELD

One or more embodiments described herein relate to systems and computerized methods for detecting resiliency hotspots in computer networks and generating resource mitigation actions.

BACKGROUND

In some instances, computer networks can be prone to failures and outages. A need exists, therefore, for systems and computerized methods to detect and mitigate vulnerability hotspots in computer networks.

SUMMARY

According to an embodiment, a non-transitory, processor-readable medium stores instructions that, when executed by a processor, cause the processor to, based on (1) an authentication data associated with a cloud service and (2) an indication of a first resource associated with the cloud service, generate a first application programming interface (API) call to retrieve, from a database associated with the cloud service, first resource configuration data associated with the first resource. The first resource is analyzed to produce first resilience data, based on (1) the first resource configuration data, (2) user configuration data associated with the cloud service, and (3) predetermined configuration data associated with the cloud service. A second resource associated with the cloud service is identified based on an indication of a load balancer associated with the cloud service. Based on the authentication data and an indication of the second resource, a second API call is generated to retrieve, from the database, second resource configuration data associated with the second resource. The instructions also cause the processor to analyze the second resource to produce second resilience data, based on the second resource configuration data, the user configuration data, and the predetermined configuration data. Based on the first resilience data and the second resilience data, an indication of a vulnerability hotspot associated with the cloud service is generated. In response to generating the indication of the vulnerability hotspot, the instructions cause a signal to be generated, the signal including (1) the indication of the vulnerability hotspot and (2) an indication of a resource mitigation action based on the predetermined configuration data and the indication of the vulnerability hotspot.

According to an embodiment, a method includes receiving, at a plurality of processors, (1) user configuration data associated with a cloud service and (2) predetermined configuration data associated with the cloud service. For each processor from the plurality of processors, the method includes receiving, at that processor, an indication of a resource group different from remaining resource groups from a plurality of resource groups. Via that processor and based on the predetermined configuration data and the indication of that resource group, a resource associated with that resource group is analyzed to produce first resilience data. The method also includes retrieving, via that processor and based on the indication of that resource group, an indication of a load balancer associated with that resource group. Via that processor and based on the indication of the load balancer, at least one additional resource is identified. The at least one additional resource is analyzed, via that processor and based on the predetermined configuration data and the indication of that resource group, to produce second resilience data. Via an aggregation processor and based (1) the user configuration data, (2) the first resilience data received from each processor from the plurality of processors, and (3) the second resilience data received from each processor from the plurality of processors, an indication of a vulnerability hotspot associated with the cloud service is generated. In response to generating the indication of the vulnerability hotspot, the method includes causing, via the aggregation processor, a signal that includes the indication of the vulnerability hotspot to be generated.

DETAILED DESCRIPTION

As legacy and/or on-premises software applications are migrated to cloud-based infrastructure, resilience aspects can be inadvertently unaccounted for. As a result, some known distributed architectures can be susceptible to failure and/or reduced availability. Some known techniques evaluate cloud-based systems for security vulnerabilities and cost optimizations. Some other known techniques for analyzing the resilience of a cloud application assess a predefined network architecture (e.g., an assessment of resources that are known prior to the assessment). Such known methods, however, do not identify unknown resources and/or do not search and analyze an unknown or partially known network. As a result, such known methods are typically used when network-specific (and often security sensitive) information is known about the network but cannot typically be used when such data is unknown, unavailable, and/or protected (e.g., not available to a third party). A need exists, therefore, for systems configured to detect vulnerability hotspots (e.g., vulnerabilities) that can indicate reduced resilience and/or reliability and can be associated with and/or cause faults and/or failures within a network and/or cloud-based applications. As described herein, to detect these vulnerability hotspots, at least some systems and methods described herein can generate at least one Application Programming Interface (API) call to automatically discover a network element (e.g., subscription(s), a resource group(s), a resource(s), etc.) and analyze the network's resilience based on that discovered network element. Moreover, at least some systems and methods described herein can automatically cause a modification to the network based on the detection of a vulnerability hotspot.

At least some embodiments described herein can improve data security and/or privacy by analyzing and/or assessing cloud applications without accessing these cloud-based applications. For example, in some embodiments, configuration data for a cloud-based application can be retrieved and/or analyzed (1) without executing the cloud-based application or (2) by executing only a portion of the cloud-based application. As described further herein, authentication data (e.g., an authentication token) can be used to access the configuration data, and in some implementations, this authentication data can be different than access authentication data that is used to access and/or execute the cloud-based application. For example, in some implementations, the authentication data can provide access to only a portion of the cloud-based application (e.g., a portion of the cloud-based application associated with a subscription, a resource group, a resource, etc., as described further herein). As a result, at least some embodiments described herein can improve privacy and data protection by, for example, excluding access to and/or analysis of personally identifiable information to detect a vulnerability hotspot. At least some embodiments described herein can also improve data security and/or privacy by not requiring the input of a predefined network architecture (unlike some known techniques described above) and instead by automatically discovering relevant network elements. Predefined network architecture data can include excessive amounts of data that are not relevant to vulnerability analysis of a given cloud-based application. For example, such predefined network architecture data can include resources used by another cloud-based application but not the given cloud application under analysis. By including relevant network data (e.g., data associated with resources used by the cloud-based application under analysis) and excluding nonrelevant network data, at least some embodiments described herein can facilitate data minimization.

At least some embodiments described herein are performed automatically (e.g., without human intervention) and, as a result, can analyze cloud-based application infrastructure and/or networks on a large scale and/or can adapt to different networks having differing sizes and/or numbers of resources. Moreover, as described further herein, at least some embodiments can be implemented by (1) a plurality of processors to concurrently analyze a plurality of resource groups and (2) an aggregation processor to aggregate analysis results for each resource group from the plurality of resource groups. By implementing at least some systems and methods described herein using the plurality of processors and the aggregation processor, processing time for vulnerability hotspot detection can be reduced and/or a large number of cloud resources can be analyzed more efficiently.

Additionally, at least some embodiments described herein can generate at least one API call, as described further herein. An API call can include a message sent from a client device (e.g., a compute device that is functionally and/or structurally similar to the compute device 120, described herein) to a server (e.g., a compute device that is functionally and/or structurally similar to the compute device 110, described herein) to indicate a request for a service and/or information. The API call can specify an endpoint associated with the server and a type of request (e.g., a GET request) to retrieve specific information. The client device can generate a plurality of API calls to retrieve and analyze information for different components and/or layers of a network that implements a cloud-based application (without a need to fully access the cloud-based application in at least some instances).

Figure 1:
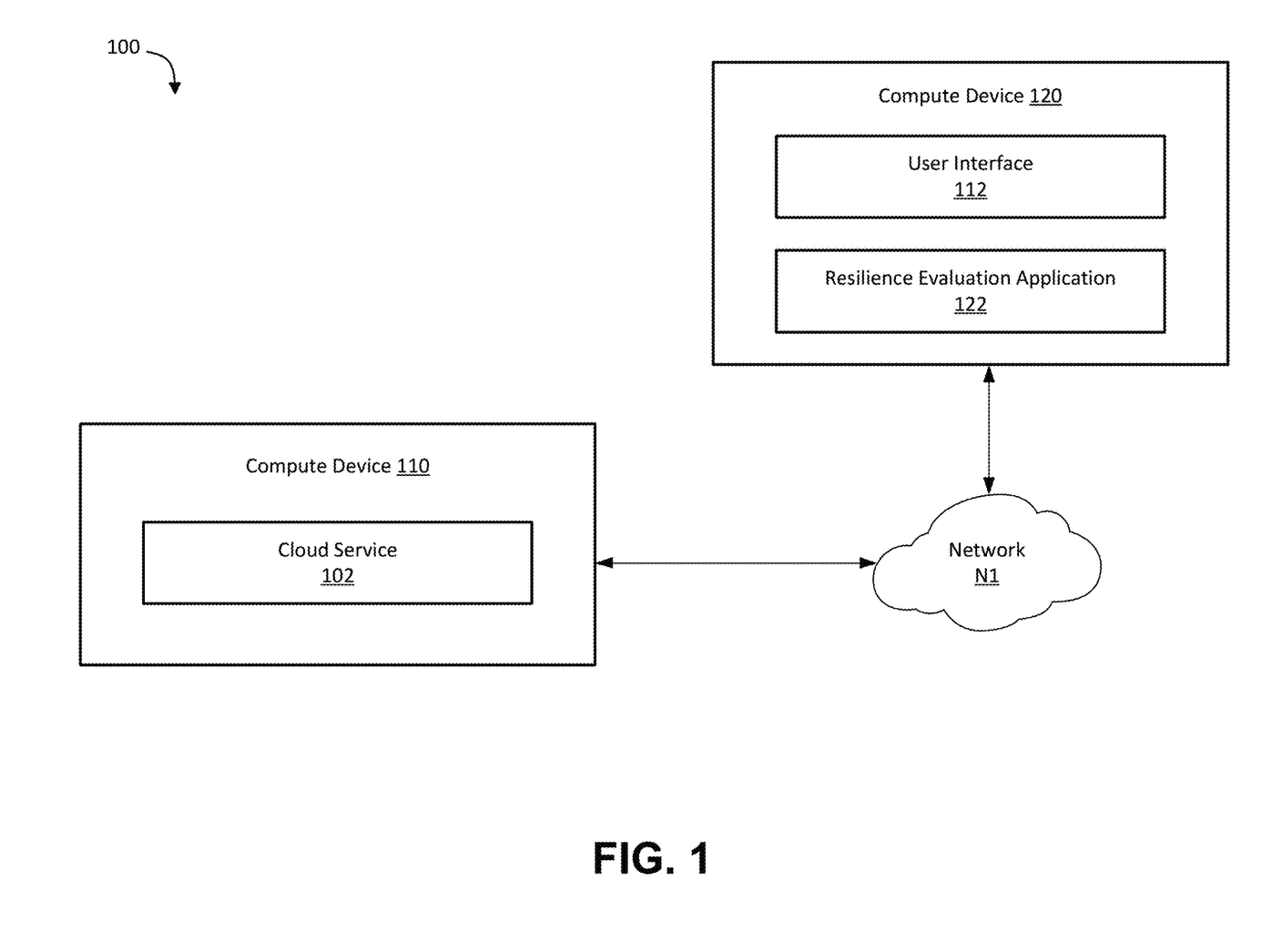
FIG. 1 shows a system block diagram of a resilience evaluation system, according to an embodiment.

FIG. 1 shows a system block diagram of a resilience evaluation system 100, according to an embodiment. The resilience evaluation system 100 includes a compute device 110, a compute device 120, and a network N1. The resilience evaluation system 100 can include alternative configurations, and various steps and/or functions of the processes described below can be shared among the various devices of the resilience evaluation system 100 or can be assigned to specific devices (e.g., the compute device 110, the compute device 120, and/or the like). For example, in some configurations, a user can provide inputs directly to the compute device 120 rather than via the compute device 110, as described herein.

In some embodiments, the compute device 110 and/or the compute device 120 can include any suitable hardware-based computing devices and/or multimedia devices, such as, for example, a server, a desktop compute device, a smartphone, a tablet, a wearable device, a laptop and/or the like. In some implementations, the compute device 110 and/or the compute device 120 can be implemented at an edge node or other remote computing facility. In some implementations, each of the compute device 110 and/or compute device 120 can be a data center or other control facility configured to run and/or execute a distributed computing system and can communicate with other compute devices.

Figure 2:
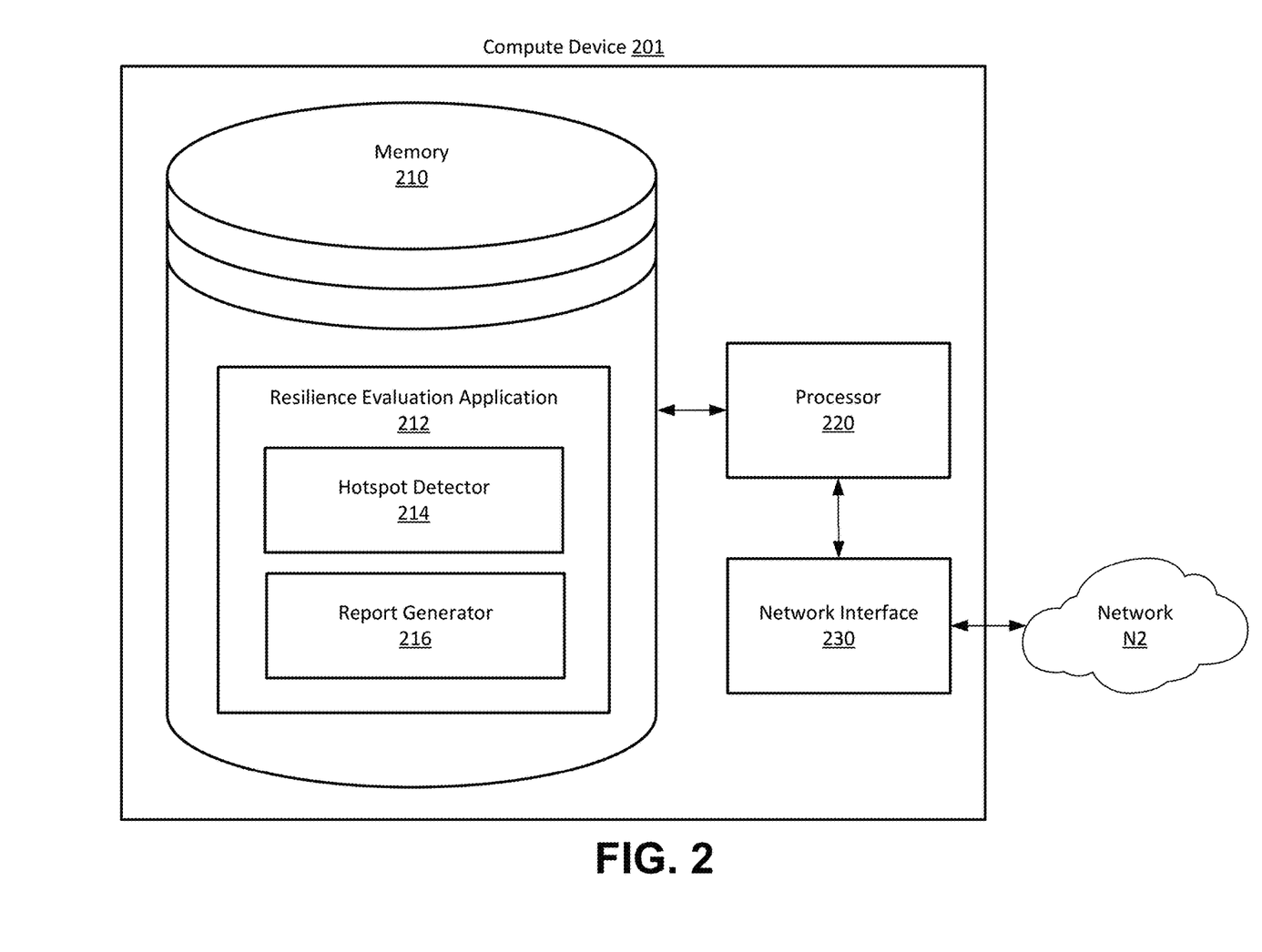
FIG. 2 shows a system block diagram of a compute device included in a resilience evaluation system, according to an embodiment.

The compute device 110 can be, for example, a cloud server(s) configured to execute (e.g., via a processor structurally and/or functionally similar to the processor 220 of FIG. 2, described herein) at least a portion of a cloud service 102, which can be stored at a memory functionally and/or structurally similar to the memory 210 of FIG. 2. The cloud service 102 can include cloud service infrastructure software and/or at least a portion of application software deployed on cloud (e.g., distributed and/or remote) computing infrastructure. In some implementations, the compute device 120 can be a client and/or endpoint compute device that can be used to connect to and/or manipulate a cloud application implemented by the cloud service 102.

The compute device 120 can implement a user interface 112 and a resilience evaluation application 122. The user interface 112 can be a graphical user interface (GUI) that is structurally and/or functionally similar to a user interface 302 of FIG. 3 (described herein), and the resilience evaluation application 122 can be functionally and/or structurally equivalent to the resilience evaluation application 212 of FIG. 2 (described herein). The compute device 120 can be configured to receive input data from the user via the user interface 112 and/or cause display, via the user interface 112, of output data generated by the resilience evaluation application 122. The input data can include for example user login data and/or user configuration data, and the output data can include for example an indication of a vulnerability hotspot(s) and/or an indication of a resource mitigation action, as described further herein. The resilience evaluation application 122 can be implemented via software and/or hardware.

The compute device 110 can be networked and/or communicatively coupled to the compute device 120, via the network N1, directly using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the resilience evaluation system 100 can include multiple compute devices 110 and/or compute devices 120. For example, in some implementations, the resilience evaluation system 100 can include a plurality of compute devices 110, where each compute device 110 can be associated with a different user from a plurality of users. In some implementations, a plurality of compute devices 110 can be associated with a single user, where each compute device 110 can be associated with, for example, a different input modality (e.g., text input, audio input, video input, etc.).

FIG. 2 shows a system block diagram of a compute device included in a resilience evaluation system, according to an embodiment. The compute device 201 can be structurally and/or functionally similar to, for example, the compute device 120 of the resilience evaluation system 100 shown in FIG. 1. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus). In some implementations, as described further herein, the processor 220 can include a plurality of processors arranged in parallel and/or an aggregation processor.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, including machine learning models, as described herein. Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with a resilience evaluation application 212. The resilience evaluation application 212 can be functionally and/or structurally similar to resilience evaluation application 122 of FIG. 1.

Figure 3:
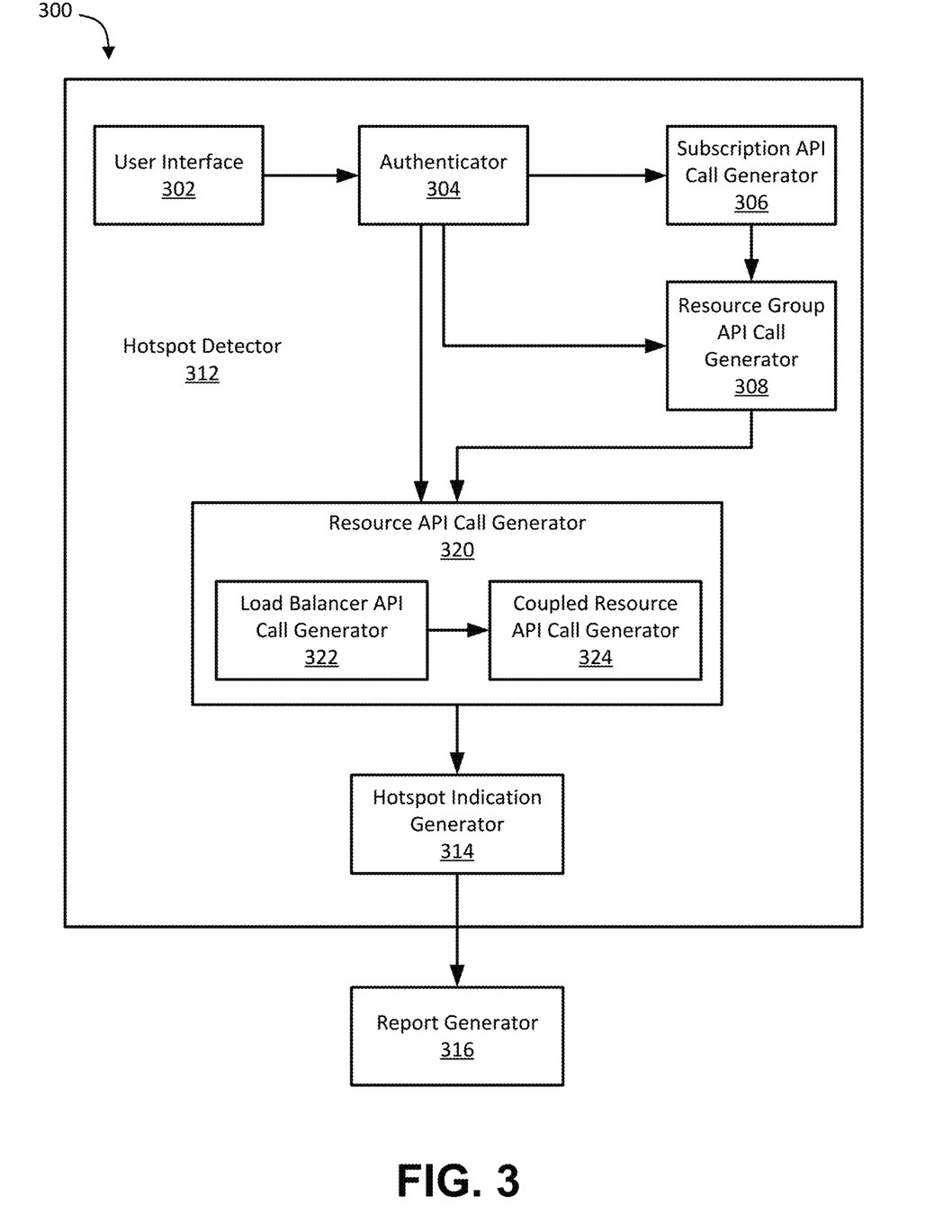
FIG. 3 shows a system block diagram of software components included in a resilience evaluation system, according to an embodiment.
Figure 4:
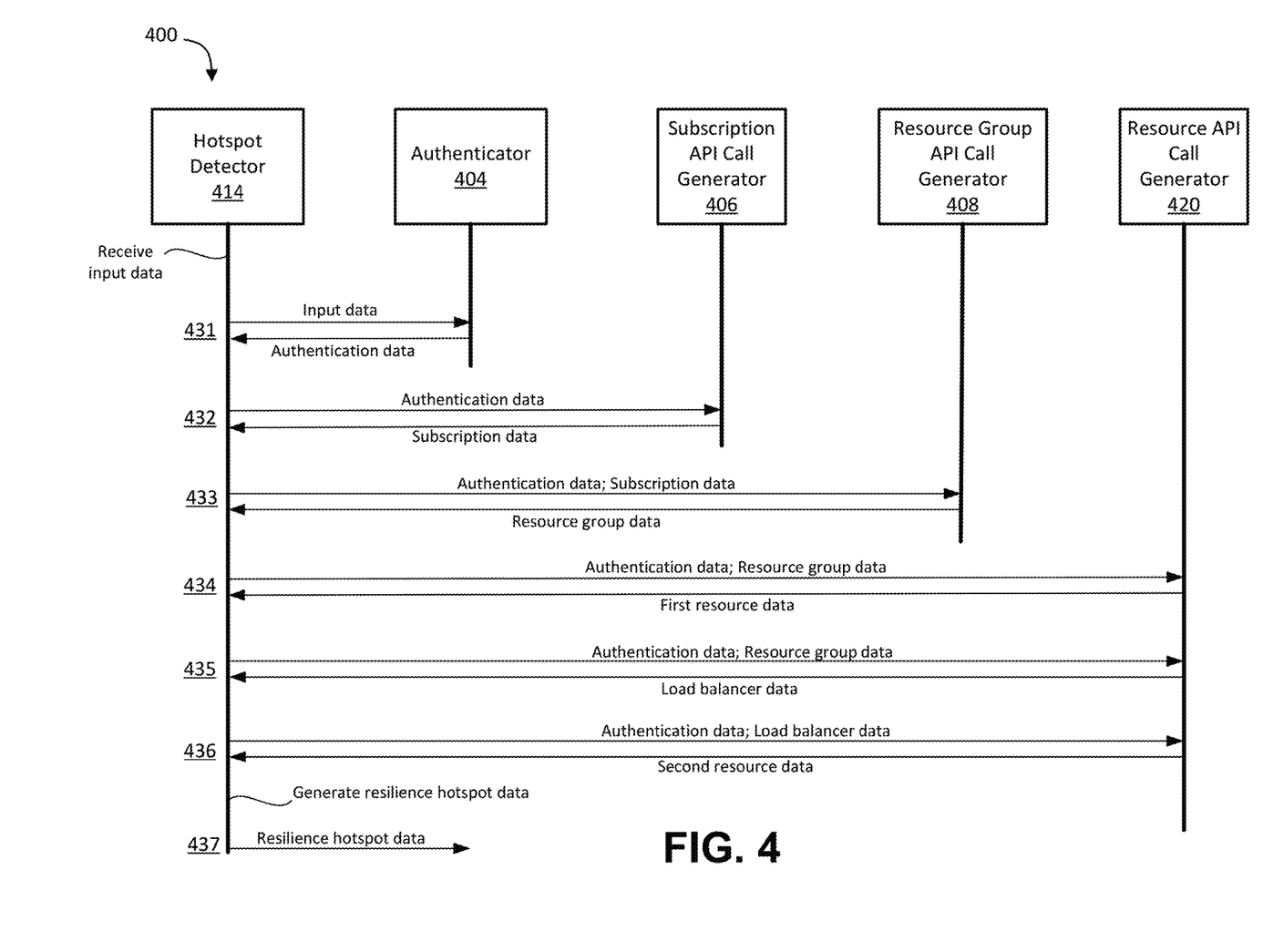
FIG. 4 shows a swim lane diagram including interactions that are performed by a resilience evaluation system, according to an embodiment.

The resilience evaluation application 212 can include a hotspot detector 214, which can be functionally and/or structurally similar to the hotspot detector 312 of FIG. 3 and/or the hotspot detector 414 of FIG. 4, each of which are described further herein. The resilience evaluation application 212 can also include a report generator 216, which can be functionally and/or structurally similar to the report generator 316 of FIG. 3 and/or the report generator 416 of FIG. 4, each of which are described further herein.

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include a display, an input device, and/or an output interface (not shown in FIG. 2). The display can be any display device by which the compute device 201 can output and/or display data (e.g., via a user interface that is structurally and/or functionally similar to the user interface 112 of FIG. 1). The input device can include a mouse, keyboard, touch screen, voice interface, and/or any other hand-held controller or device or interface via which a user may interact with the compute device 201. The output interface can include a bus, port, and/or other interfaces by which the compute device 201 may connect to and/or output data to other devices and/or peripherals.

FIG. 3 shows a system block diagram of software components 300 included in a resilience evaluation system, according to an embodiment. The software components 300 can be associated with a compute device (e.g., a compute device that is structurally and/or functionally similar to the compute device 201 of FIG. 2 and/or the compute devices 110 and 120 of FIG. 1). In some instances, for example, the software components 300 can be included in the resilience evaluation application 122 and/or the resilience evaluation application 212, and/or can include software stored in memory 210 and configured to execute via the processor 220 of FIG. 2. In some instances, for example, at least a portion of the software components 300 can be implemented in hardware. The software components 300 include a hotspot detector 312 (e.g., that is functionally and/or structurally similar to the hotspot detector 214 of FIG. 2) and a report generator 316 (e.g., that is structurally and/or functionally similar to the report generator 216 of FIG. 2). The hotspot detector 312 includes a user interface 302 (e.g., that is functionally and/or structurally similar to the user interface 112 of FIG. 1), an authenticator 304 (e.g., that is functionally and/or structurally similar to an authenticator 404 of FIG. 4), a subscription API call generator 306 (e.g., that is functionally and/or structurally similar to a subscription API call generator 406 of FIG. 4), a resource group API call generator 308 (e.g., that is functionally and/or structurally similar to a resource group API call generator 408 of FIG. 4), a resource API call generator 320 (e.g., that is functionally and/or structurally similar to a resource API call generator 420 of FIG. 4), and a hotspot indication generator 314.

The user interface 302 can be configured to receive input data (e.g., user login data, such as username data, password data, etc.) from a user. The input data can be associated with a cloud application that is to be analyzed (e.g., a cloud application implemented by a cloud service that is functionally and/or structurally similar to the cloud service 102 of FIG. 1). For example, the input data can include login credential data that can be used to access at least one feature of the cloud application. In some implementations, the user interface 302 can include a graphical user interface (GUI) that can prompt a user for the authentication data, prompt a user to select a cloud application to analyze, and/or display reports generated by the report generator 316, as described herein. The user interface 302 can also be configured to collect user configuration data from a user, as described herein.

The authenticator 304 can be configured to facilitate access to cloud accounts, subscriptions, resource groups, resources, and/or other aspects of a cloud service associated with the cloud application. In some implementations, the authenticator 304 can generate authentication data (e.g., an authentication token) based on the input data received via the user interface 302, and the hotspot detector 312 can use the authentication data (e.g., the authentication token) to access cloud resources. For example, the authenticator 304 can provide a token to cause (at least in part) (1) the subscription API call generator 306 to retrieve a subscription list, (2) the resource group API call generator 308 to retrieve an indication of a resource group, and/or (3) the resource API call generator 320 to retrieve an indication of a resource, as described further herein. The authenticator 304 can also manage authentication for evaluators (e.g., users that can run resilience evaluations) and/or for users that can review reports (e.g., that are generated by the report generator 316). In some implementations, as shown in FIG. 3, the authenticator 304 can provide the authentication token as input to at least one of the subscription API call generator 306, the resource group API call generator 308, and/or the resource API call generator 320 to confirm that the user is authorized to request and/or receive data from the API call generator(s). In other implementations, as shown in FIG. 4, the authenticator 304 can provide an authentication token to the hotspot detector 312, which can be configured to forward the authentication token to an API call generator(s) as needed.

In response to receiving an authentication token (and/or similar authentication data) from the authenticator 304, the subscription API call generator 306 can generate a first API call to retrieve (e.g., from a cloud REST service and/or a database associated with the cloud service) a subscription list (or data that can be used to generate the subscription list) associated with the cloud application (e.g., a subscription list by tenant, organization, etc.). A subscription list can include a list of at least one subscription, and a subscription can be a container for resource groups, described further below. More specifically, a subscription can be a collection of at least one resource group, where the collection is associated with a billing account for a cloud service. In some implementations, a user can select a subscription(s) from the subscription list. Alternatively or in addition, in some implementations, the hotspot detector 312 can be configured to iterate and/or loop through the subscription list to analyze each subscription from the subscription list.

To identify and/or analyze a resource group(s) from a subscription, the subscription API call generator 306 can provide the authentication data and an indication of that subscription selected from the subscription list as input to the resource group API call generator 308. In response, the resource group API call generator 308 can generate a second API call to retrieve (e.g., from the cloud REST service and/or the database) an indication of at least one resource group (or data that can be used to generate the indication of the resource group(s)). A resource group can be, for example, a container for and/or a set of resources that can be used to implement a cloud application. A resource can include, for example, a virtual machine (VM), a managed disk, a backup vault, a cloud file, a storage account, a network and/or associated data and/or functions (e.g., a virtual network, a public IP address, a network security group, a virtual private network (VPN) gateway, a load balancer, etc.), an app service, a structured query language (SQL) database, a function app, and/or the like. In some implementations, a user can select a resource group(s) from the at least one resource group. Alternatively or in addition, in some implementations, the hotspot detector 312 can be configured to iterate and/or loop through the at least one resource group to analyze each resource group from the at least one resource group.

To analyze a resource from a resource group, the resource API call generator 320 can receive the authentication data from the authenticator 304 and an indication of the resource group as input from the resource group API call generator 308. In response, the resource API call generator 320 can generate a third API call to retrieve (e.g., from the cloud REST service and/or the database) an indication of at least of at least one resource that is included in the resource group. The resource API call generator 320 can be further configured to select (e.g., automatically and/or without human intervention) a resource from the at least one resource and generate a fourth API call to retrieve (e.g., from the cloud REST service and/or the database) resource configuration data associated with that resource. Resource configuration data can include and/or indicate, for example, resource type (e.g., virtual machine scale set (VMSS), virtual machine (VM), load balancer, managed cluster (e.g., that is associated with a Kubernetes service, such as Azure® Kubernetes Service (AKS) and/or the like), etc.), VM size (e.g., number of computer processing units (CPUs), number of cores, and/or a similar CPU metric), VM provision type (e.g., spot, reserved, etc.), etc.

In some implementations, the resource API call generator 320 can identify at least one resource having a specified type from the resource group. For example, the resource API call generator 320 can include a load balancer API call generator 322 that can be configured to generate an API call to retrieve an indication of at least one load balancer (e.g., all load balancers) included in a given resource group. The indication of the at least one load balancer can include a load balancer identifier(s), and the resource API call generator 320 can further include a coupled resource API call generator 324 that can be configured to determine at least one virtual machine that is operably coupled to a load balancer that is associated with a load balancer identifier. This at least one virtual machine can be included in and/or associated with the resource group and/or the subscription identified by the resource group API call generator 308 and/or the subscription API call generator 306, respectively. Alternatively, this at least one virtual machine can be included in and/or associated with a different resource group and/or a different subscription (e.g., a resource group and/or a subscription that was not identified and/or analyzed by the hotspot detector 312). The resource API call generator 320 can use an indication of the at least one virtual machine (e.g., identified by the coupled resource API call generator 324) to retrieve (e.g., from the cloud REST service and/or the database) resource configuration data associated with that at least one virtual machine.

The hotspot indication generator 314 can be configured to generate resilience data for at least one resource identified by at least one of the resource API call generator 320, the load balancer API call generator 322, and/or the coupled resource API call generator 324. Resilience data can indicate, for example, (1) a likelihood that a resource and/or a set of resources will fail, (2) a likelihood that a failure of a resource and/or a set of resources will lead to a failure of a cloud service and/or a cloud application that uses that resource and/or set of resources, and/or (3) a degree and/or severity of a failure of a resource and/or a set of resources. The hotspot indication generator 314 can generate the resilience data based on resource configuration data, predetermined configuration data and/or user configuration data. The hotspot indication generator 314 can receive the configuration data from at least one of the resource API call generator 320, the load balancer API call generator 322, and/or the coupled resource API call generator 324. The configuration data can be associated with at least one of a resource included in a resource group that is identified by the resource group API call generator 308, a resource (e.g., a load balancer) identified by the load balancer API call generator 322, and/or a resource identified by the coupled resource API call generator 324.

The predetermined configuration data can indicate guidelines, best practices, and/or recommended configurations associated with a resource. In some implementations, the predetermined configuration data can include codes (e.g., fault codes) associated with predetermined faults and/or predetermined configurations that can be sub-optimal. The predetermined configuration data can be associated with a specific type of resource. For example, for an Azure® Kubernetes Service (AKS) resource, the predetermined configuration data can include a fault code associated with at least one of autoscaling, dedicated system and/or user agent pools, AKS monitoring, a threshold (e.g., maximum) number of pods permitted per node in a system agent pool, etc. The hotspot indication generator 314 can receive the fault codes as input and, based on configuration data associated with an AKS resource, can be configured to generate an indication of a vulnerability hotspot (e.g., a fault indication) if the configuration data indicates that, for example, autoscaling is not enabled for the AKS resource, the AKS resource does not have a dedicated system and/or user agent pool(s) configured, AKS monitoring is not enabled for the AKS resource, the number of pods per node in a system agent pool that is associated with the AKS resource exceeds a predefined threshold number, and/or the like.

The predetermined configuration data can also indicate geographic requirements for resources. For example, the predetermined configuration data can indicate a threshold (e.g., minimum, predetermined, etc.) geographic distance between resources (e.g., between the compute devices on which the virtual machines are operating). Respective configuration data associated with virtual machines can indicate a location (e.g., a geographic location, an extended location, etc.) of the compute devices running the respective virtual machines, and the hotspot indication generator 314 can be configured to determine a geographic distance between the compute devices on which the virtual machines are operating based on the respective locations. The hotspot indication generator 314 can be further configured to compare that geographic distance to the predetermined geographic distance indicated by the predetermined configuration data. If the geographic distance is less than the predetermined threshold geographic distance, the virtual machines can collectively be susceptible to a single point failure. For example, a fault can affect a plurality of virtual machines within a region and/or availability zone that includes the plurality of virtual machines. Thus, the hotspot indication generator can generate an indication of a vulnerability hotspot based on the predetermined threshold geographic distance.

The predetermined configuration data can also include at least one predetermined criterion. For example, a predetermined criterion can indicate that a virtual machine should be coupled to a load balancer; otherwise, the load balancer can be prone to a single point failure. As yet another example, a predetermined criterion can indicate that a plurality of virtual machines (e.g., that are in a cluster) should have a homogenous or a substantially similar (e.g., at least 80% similar) configuration. If a virtual machine is not operably coupled to a load balancer, or if a plurality of virtual machines (e.g., in a cluster) do not have a common and/or homogenous configuration (or substantially similar), the hotspot indication generator 314 can be configured to generate an indication of a vulnerability hotspot, described further below.

The user configuration data can include, for example, a cost threshold, an availability metric, and/or a criticality metric. The cost threshold, the availability metric, and/or the criticality metric can be defined by a user (e.g., an enterprise, etc.) for a resource, a subscription, a cloud application, a cloud service, etc. The cost threshold can include an indication of a threshold (e.g., maximum) monetary amount that the user is willing to pay for resources associated with a cloud application. The hotspot indication generator 314 can be configured to modify the assessment of configuration data determined by the resource API call generator 320. For example, if the cost threshold indicates that a user has a higher monetary budget, the hotspot indication generator 314 can use an increased threshold value and/or a more stringent requirement indicated by the predetermined configuration data to evaluate the predetermined configuration data of a resource(s). For example, the hotspot indication generator 314 can compare a distance between two virtual machines with an increased minimum threshold geographic distance value if the cost threshold indicates that a user has a higher monetary budget as compared to a lower monetary budget. As yet another example, the hotspot indication generator 314 can compare a virtual machine size (e.g., a number of CPUs, a number of cores, etc.) to a minimum predetermined size that is higher if the cost threshold indicates that a user has a higher monetary budget as compared to a lower monetary budget.

Similar to the cost threshold, the availability metric and/or the criticality metric can also affect assessment of configuration data performed by the hotspot indication generator 314. The availability metric can include, for example, a threshold (e.g., maximum) downtime duration for a resource, a cloud application, etc. The criticality metric can indicate an importance of a resource, a cloud application, etc. A user can specify that a cloud application is critical to an operation and/or specify that downtime of the cloud application should be at most 30 minutes, for example, and the hotspot indication generator 314 can generate an indication of a vulnerability hotspot (described further below) for given configuration data. For the same given configuration, if the user specifies that a cloud application is not critical to an operation and/or that downtime of the cloud application should be at most 60 minutes, the hotspot indication generator 314 can prevent an indication of a vulnerability hotspot from being generated.

Based on resilience data determined by the hotspot indication generator 314 for at least one resource, the hotspot indication generator 314 can be further configured to generate an indication of a vulnerability hotspot, which can indicate that a cloud application and/or a cloud service as configured is vulnerable to a fault and/or failure. The indication of the vulnerability hotspot can be based on resilience data for the at least one resource. For example, resilience data for a plurality of virtual machines operably coupled to a load balancer can indicate that the plurality of virtual machines do not have a common and/or homogenous (or substantially similar) configuration. Based on this resilience data, the hotspot indication generator 314 can generate an indication of the vulnerability hotspot that indicates that the absence of a homogenous configuration among the virtual machines can cause a cloud application that uses the virtual machines to be susceptible to a loss of function. Alternatively, if the resilience data indicates that the virtual machines have a common and/or homogenous configuration, these virtual machines collectively are more likely to be fault tolerant. For example, the load balancer can implicate a first virtual machine if a second virtual machine fails, and impact on the cloud application can be reduced if the respective configurations of the first virtual machine and the second virtual machine are at least similar (e.g., at least 80% similar). In response, the hotspot indication generator 314 can forgo generating an indication of a vulnerability hotspot based on that resilience data. In some instances, an indication of a vulnerability hotspot can indicate a plurality of hotspots (e.g., weaknesses, deficiencies, etc.) associated with a plurality of resources, a plurality of resource groups, a plurality of load balancers, at least one cloud application, at least one cloud service, etc.

The report generator 316 can be configured to generate data that represents a human-readable output (e.g., text data and/or the like). Additionally, the report generator 316 can cause a signal that encodes the human-readable output to be transmitted to a user compute device (e.g., that is functionally and/or structurally similar to the compute device 120 of FIG. 1). The signal can cause display of the human-readable output (e.g., a report) via a screen operably coupled to the user compute device and/or a user interface (e.g., that is structurally and/or functionally similar to the user interface 112 of FIG. 1) implemented by the user compute device. The human-readable output can include and/or be based on the indication of the vulnerability hotspot generated by the hotspot indication generator 314. For example, the human-readable output can indicate a single point failure associated with a resource, an absence of sufficient redundancy associated with a resource, insufficient geographic distribution associated with a plurality of resources, insufficient load balancing, insufficient fault tolerance, an availability inconsistency (e.g., based on a user-defined availability requirement), mistuned configurations, etc. In some instances, the human-readable output can include a historical record of evaluations for an application.

In some instances, the report generator 316 can be further configured to generate an indication of a resource mitigation action for a given resource(s) based on the indication of a vulnerability hotspot for that given resource(s) and predetermined configuration data for that given resource(s). The resource mitigation action can include a suggestion to modify the configuration of a resource(s) based on a best practice indicated by the predetermined configuration data. For example, the resource mitigation action can provide a text-based recommendation and/or request to a user to increase the size of a virtual machine, increase the number of virtual machines, introduce a load balancer, improve configuration homogeneity among a plurality of resources, etc. Alternatively or in addition, in some embodiments, the indication of the resource mitigation action can automatically (e.g., without human intervention) cause a change(s) to the network that implements the cloud-based application. For example, based on the vulnerability hotspot data indicating that a resource (e.g., a virtual machine) is not coupled to a load balancer, the indication of the resource mitigation can cause (1) the resource to be coupled to an existing load balancer that is coupled to at least one additional resource and/or (2) a load balancer and/or at least one additional resource to be generated, such that this load balancer can be operably coupled to the resource.

In some embodiments, at least a portion of the hotspot detector 312 can be implemented by a plurality of processors (e.g., processors that are structurally and/or functionally similar to the processor 220 of FIG. 2) in a parallel computing process. For example, a plurality of instances of the subscription API call generator 306 and/or a plurality of instances of the resource group API call generator 308 can be executed in a parallel, such that a processor from a plurality of processors arranged in parallel executes an instance of the subscription API call generator 306 and/or an instance of the resource group API call generator 308. As a result, each processor from the plurality of processors can output (1) an indication of a subscription(s) that is different from remaining subscriptions that are associated with a cloud application and/or (2) an indication of a resource group(s) that is different from remaining resource groups that are associated with a cloud application. In some implementations, parallel computing can be performed at the resource group level but not at the resource level, as hotspot detection can be skewed without resource alignment. Similarly stated, hotspot detection at the resource group level rather than the individual resource level can permit analysis of interactions between resources and/or analysis of resource behavior in the context of other resources. Thus, in some implementations, parallel processing is not performed to analyze individual resources within a resource group. Similarly stated, any resources within a given resource group can be analyzed (e.g., via the resource API call generator 320) at a common processor. An aggregation processor (e.g., that is structurally and/or functionally similar to the processor 220 of FIG. 2) can collect output data (e.g., resilience data) from a plurality of processors arranged in parallel. Each processor from the plurality of processors can be associated at least one resource group, and each resource from a given resource group can be analyzed via the same processor. Similarly stated, a plurality of processors can analyze a plurality of resource group in parallel, but a plurality of resources from one resource group can be analyzed via one processor (and not, for example, via a plurality of processors in parallel). The aggregation processor can aggregate (e.g., by executing the hotspot indication generator 314) respective output data from a plurality of processors to generate an indication of a vulnerability hotspot.

FIG. 4 shows a swim lane diagram including a plurality of interactions 431-437 between software components 400 that are included in a resilience evaluation system (e.g., that is functionally and/or structurally similar to the resilience evaluation system 100 of FIG. 1), according to an embodiment. The software components 400 can be associated with and/or executed by a compute device that is structurally and/or functionally similar to the compute device 201 of FIG. 2 and/or the compute device 120 of FIG. 1. In some instances, for example, the software components 400 can be implemented as software stored in memory 210 and configured to be executed by the processor 220 of FIG. 2. For example, at least a portion of the software components 400 can be included in a resilience evaluation application that is functionally and/or structurally similar to the resilience evaluation application 122 of FIG. 1 and/or the resilience evaluation application 212 of FIG. 2. In some instances, for example, at least a portion of the software components 400 can be implemented in hardware.

The software components 400 include a hotspot detector 414 (e.g., that is structurally and/or functionally similar to the hotspot detector 214 of FIG. 2 and/or the hotspot detector 312 of FIG. 3), an authenticator 404 (e.g., that is structurally and/or functionally similar to the authenticator 304 of FIG. 3), a subscription API call generator 406 (e.g., that is structurally and/or functionally similar to the subscription API call generator 306 of FIG. 3), a resource group API call generator 408 (e.g., that is structurally and/or functionally similar to the resource group API call generator 308 of FIG. 3), and a resource API call generator 420 (e.g., that is structurally and/or functionally similar to the resource API call generator 320 of FIG. 3). In some embodiments, a plurality of processors arranged in parallel can concurrently execute a plurality of subscription API call generators 406 and/or a plurality resource group API call generators 408.

At 431, the hotspot detector 414 forwards input data to the authenticator 404. The input data can include user login data and can be received from a user via a user interface that is structurally and/or functionally similar to the user interface 112 of FIG. 1. The authenticator 404 can generate authentication data (e.g., an authentication token) that can be returned to the hotspot detector 414. Alternatively, although not shown in FIG. 4, the authentication token can be forwarded from the authenticator 404 to at least one of the subscription API call generator 406, the resource group API call generator 408, or the resource API call generator 420. The interaction 431 can be implemented by a first API call generated via the hotspot detector 414.

At 432, the hotspot detector 414 can cause the authentication data to be sent to the subscription API call generator 406 to cause the subscription API call generator 406 to return subscription data to the hotspot detector 414. The subscription data can include a list of at least one subscription associated with a cloud application and/or a cloud service (e.g., the cloud application and/or the cloud service being analyzed). The interaction 432 can be implemented by a second API call generated via the hotspot detector 414.

At 433, the hotspot detector 414 can cause the authentication data and the subscription data (or a portion of the subscription data) to be sent to the resource group API call generator 408 to cause the resource group API call generator 408 to return resource group data to the hotspot detector 414. The resource group data can indicate at least one resource group associated with a subscription indicated by the subscription data. The interaction 433 can be implemented by a third API call generated via the hotspot detector 414.

At 434-435, the hotspot detector 414 can cause the authentication data and the resource group data (or a portion of the resource group data, such as data associated with one resource group from a plurality of resource groups) to be sent to the resource API call generator 420 to cause the resource API call generator 420 to return resource data to the hotspot detector 414. The resource data can include first resource data associated with a first resource and load balancer data associated with a load balancer. The first resource and the load balancer can be included in a resource group indicated by the resource group data. The first resource data and the load balancer data can include identifiers for the first resource and the load balancer, respectively. The first resource data and the load balancer data can further include configuration data for the respective resources. The interactions 434 and 435 can be implemented by a third API call and a fourth API call, respectively, generated via the hotspot detector 414. In some implementations, although not shown in FIG. 4, the interactions 434 and 435 can be implementations by a single API call (e.g., to cause a concurrent request for and return of the first resource data and the load balancer data).

At 436, the hotspot detector 414 can cause the authentication data and the load balancer data to be sent to the resource API call generator 420 to cause the resource API call generator 420 to return second resource data associated with a second resource. The second resource can be operably coupled to the load balancer, and the load balancer can be operably coupled to the first resource. In some instances, the second resource can be included in a resource group that is different than the resource group that includes the first resource. The second resource data can include an identifier and/or configuration data for the respective resources. The interaction 436 can be implemented by a fifth API call generated via the hotspot detector 414.

The hotspot detector 414 can generate vulnerability hotspot data based on the first resource data, the load balancer data, and/or the second resource data. The vulnerability hotspot data can be further based on predetermined configuration data and/or user configuration data. The vulnerability hotspot data can include resiliency data associated with at least one of the first resource, the load balancer, or the second resource data. The hotspot data can further include an indication of the vulnerability hotspot that indicates a vulnerability associated with a cloud application and/or a cloud service. At 437, the hotspot detector can forward the indication of the vulnerability hotspot to a report generator (e.g., that is functionally and/or structurally similar to the report generator 316 of FIG. 3).

In some embodiments, vulnerability hotspot data generated by the hotspot detector 414 can be used by (1) a network that implements the cloud-based application and/or (2) a resource(s) to automatically (e.g., without human interaction) cause a remedial action. For example, based on the vulnerability hotspot data indicating that a resource (e.g., a virtual machine) is not coupled to a load balancer, the vulnerability hotspot data can cause (1) the resource to be coupled to an existing load balancer that is coupled to at least one additional resource and/or (2) a load balancer and/or at least one additional resource to be generated, such that this load balancer can be operably coupled to the resource.

Figure 5:
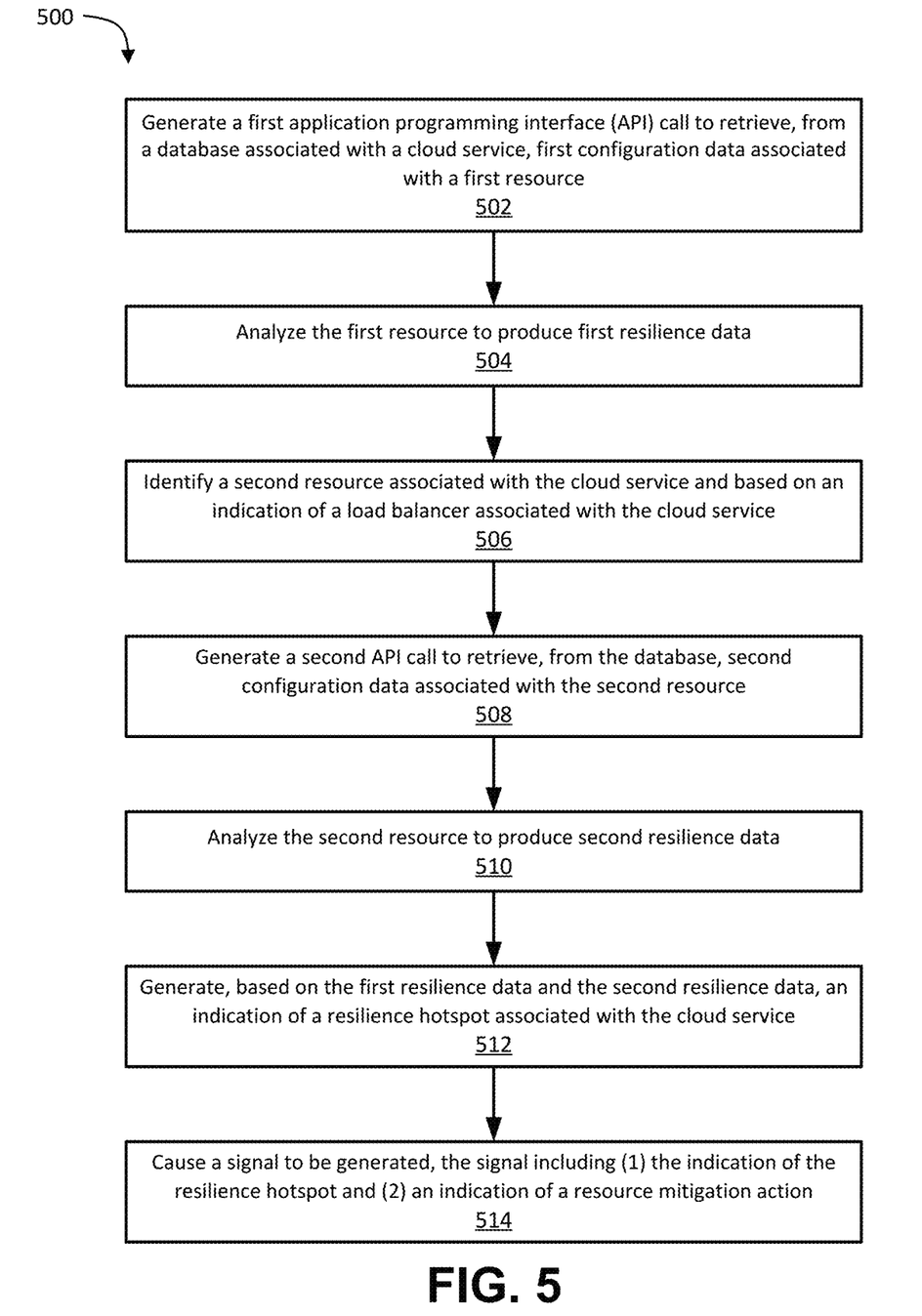
FIG. 5 shows a flow diagram illustrating a method implemented by a resilience evaluation system to generate an indication of a vulnerability hotspot and an indication of a resource mitigation action, according to an embodiment.

FIG. 5 shows a flow diagram illustrating a method 500 implemented by a resilience evaluation system, according to an embodiment. The method 500 can be implemented by a resilience evaluation system described herein (e.g., the resilience evaluation system 100 of FIG. 1). Portions of the method 500 can be implemented using a processor (e.g., the processor 220 of FIG. 2) of any suitable compute device (e.g., the compute device 201 of FIG. 2 and/or the compute devices 110 and/or 120 of FIG. 1).

The method 500 at 502 includes generating a first application programming interface (API) call to retrieve, from a database associated with the cloud service, first resource configuration data associated with the first resource. The generating can be based on (1) an authentication data associated with a cloud service and (2) an indication of a first resource associated with the cloud service. At 504, the first resource is analyzed to produce first resilience data, based on (1) the first resource configuration data, (2) user configuration data associated with the cloud service, and (3) predetermined configuration data associated with the cloud service. A second resource associated with the cloud service is identified at 506, based on an indication of a load balancer associated with the cloud service. Based on the authentication data and an indication of the second resource, a second API call is generated at 508 to retrieve, from the database, second resource configuration data associated with the second resource. The method 500 at 510 includes analyzing the second resource to produce second resilience data, based on the second resource configuration data, the user configuration data, and the predetermined configuration data. Based on the first resilience data and the second resilience data, at 512, an indication of a vulnerability hotspot associated with the cloud service is generated. In response to generating the indication of the vulnerability hotspot, the method 500 at 514 includes causing a signal to be generated, the signal including (1) the indication of the vulnerability hotspot and (2) an indication of a resource mitigation action based on the predetermined configuration data and the indication of the vulnerability hotspot.

Figure 6:
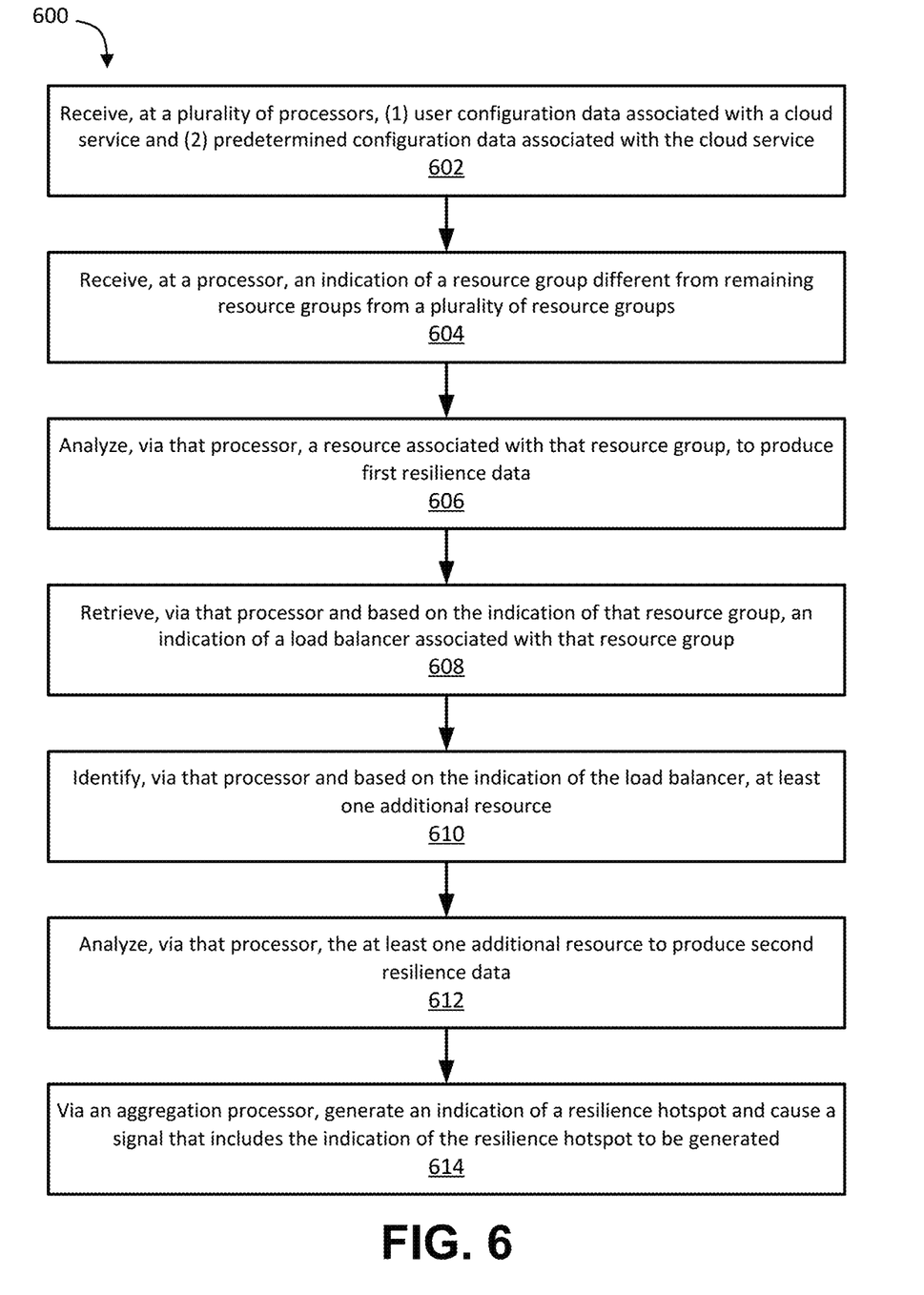
FIG. 6 shows a flow diagram illustrating a method implemented by a resilience evaluation system to generate an indication of a vulnerability hotspot via an aggregation processor, according to an embodiment.

FIG. 6 shows a flow diagram illustrating a method 600 implemented by a resilience evaluation system, according to an embodiment. The method 600 can be implemented by a resilience evaluation system described herein (e.g., the resilience evaluation system 100 of FIG. 1). Portions of the method 600 can be implemented using a processor (e.g., the processor 220 of FIG. 2) of any suitable compute device (e.g., the compute device 201 of FIG. 2 and/or the compute devices 110 and/or 120 of FIG. 1).

The method 600 at 602 includes receiving, at a plurality of processors, (1) user configuration data associated with a cloud service and (2) predetermined configuration data associated with the cloud service. For each processor from the plurality of processors, the method 600 at 604 includes receiving, at that processor, an indication of a resource group different from remaining resource groups from a plurality of resource groups. Via that processor and based on the predetermined configuration data and the indication of that resource group, at 606, a resource associated with that resource group is analyzed to produce first resilience data. The method 600 at 608 includes retrieving, via that processor and based on the indication of that resource group, an indication of a load balancer associated with that resource group. Via that processor and based on the indication of the load balancer, at 610, at least one additional resource is identified, and at 612, the at least one additional resource is analyzed, via that processor and based on the predetermined configuration data and the indication of that resource group, to produce second resilience data. At 614, via an aggregation processor and based (1) the user configuration data, (2) the first resilience data received from each processor from the plurality of processors, and (3) the second resilience data received from each processor from the plurality of processors, an indication of a vulnerability hotspot associated with the cloud service is generated. Also at 614, in response to generating the indication of the vulnerability hotspot, the method 600 includes causing, via the aggregation processor, a signal that includes the indication of the vulnerability hotspot to be generated.

According to an embodiment, a non-transitory, processor-readable medium storing instructions that, when executed by a processor, cause the processor to, based on (1) an authentication data associated with a cloud service and (2) an indication of a first resource associated with the cloud service, generate a first application programming interface (API) call to retrieve, from a database associated with the cloud service, first resource configuration data associated with the first resource. The first resource is analyzed to produce first resilience data, based on (1) the first resource configuration data, (2) user configuration data associated with the cloud service, and (3) predetermined configuration data associated with the cloud service. A second resource associated with the cloud service is identified based on an indication of a load balancer associated with the cloud service. Based on the authentication data and an indication of the second resource, a second API call is generated to retrieve, from the database, second resource configuration data associated with the second resource. The instructions also cause the processor to analyze the second resource to produce second resilience data, based on the second resource configuration data, the user configuration data, and the predetermined configuration data. Based on the first resilience data and the second resilience data, an indication of a vulnerability hotspot associated with the cloud service is generated. In response to generating the indication of the vulnerability hotspot, the instructions cause a signal to be generated, the signal including (1) the indication of the vulnerability hotspot and (2) an indication of a resource mitigation action based on the predetermined configuration data and the indication of the vulnerability hotspot.

In some implementations, the non-transitory, processor-readable medium can further store instructions to cause the processor to generate, based on the authentication data, a third API call associated with the cloud service to retrieve, from the database, a subscription list associated with the cloud service. For each subscription indication from the subscription list, the instructions can also cause the processor to generate, based on the authentication data and that subscription indication, a fourth API call associated with the cloud service to retrieve, from the database, a resource group list associated with the cloud service. For each resource group indication from the resource group list, the instructions can also cause the processor to generate, based on the authentication data and that resource group indication, a fifth API call to retrieve, from the database, a resource list that is associated with the cloud service and that includes the indication of the first resource and the indication of the load balancer.

In some implementations, the first resource can be a first virtual machine, the second resource can be a second virtual machine, and the first virtual machine and the second virtual machine can each be operably coupled to the load balancer. In some implementations, the first resilience data can include an indication of a first geographic location, and the second resilience data can include an indication of a second geographic location. Additionally, the instructions to generate the indication of the vulnerability hotspot can include instructions to generate the indication of the vulnerability hotspot based on the first geographic location being less than a predetermined distance from the second geographic location. In some implementations, the first resilience data can include an indication of a first type associated with the first resource, and the second resilience data can include an indication of a second type associated with the second resource. Additionally, the instructions to generate the indication of the vulnerability hotspot can include instructions to generate the indication of the vulnerability hotspot based on the first type being different from the second type. In some implementations, the user configuration data can include a downtime threshold. The instructions to generate the indication of the vulnerability hotspot can include instructions to generate the indication of the vulnerability hotspot based on the cloud service being associated with a plurality of resources that (1) includes the first resource and the second resource and (2) includes fewer than a number of resources that is determined based on the downtime threshold.

In some implementations, the user configuration data can include a cost threshold, and the instructions to generate the indication of the vulnerability hotspot can include instructions to generate the indication of the vulnerability hotspot based on the cloud service being associated with a plurality of resources that (1) includes the first resource and the second resource and (2) includes fewer than a number of resources that is determined based on the cost threshold. In some implementations, the first resilience data can include a first computer processing unit (CPU) metric associated with the first resource, and the second resilience data can include a second CPU metric associated with the second resource. The instructions to generate the indication of the vulnerability hotspot can include instructions to generate the indication of the vulnerability hotspot based on the first CPU metric and the second CPU metric. In some implementations, the instructions to generate the indication of the vulnerability hotspot can include instructions to generate the indication of the vulnerability hotspot based on a criticality metric included in the user configuration data. In some implementations, the authentication data can include an authentication token associated with an authorized user of a cloud application configured to be executed by a resource of the cloud service.

According to an embodiment, a method includes receiving, at a plurality of processors, (1) user configuration data associated with a cloud service and (2) predetermined configuration data associated with the cloud service. For each processor from the plurality of processors the method includes receiving, at that processor, an indication of a resource group different from remaining resource groups from a plurality of resource groups. Via that processor and based on the predetermined configuration data and the indication of that resource group, a resource associated with that resource group is analyzed to produce first resilience data. The method also includes retrieving, via that processor and based on the indication of that resource group, an indication of a load balancer associated with that resource group. Via that processor and based on the indication of the load balancer, at least one additional resource is identified, and the at least one additional resource is analyzed, via that processor and based on the predetermined configuration data and the indication of that resource group, to produce second resilience data. Via an aggregation processor and based (1) the user configuration data, (2) the first resilience data received from each processor from the plurality of processors, and (3) the second resilience data received from each processor from the plurality of processors, an indication of a vulnerability hotspot associated with the cloud service is generated. In response to generating the indication of the vulnerability hotspot, the method includes causing, via the aggregation processor, a signal that includes the indication of the vulnerability hotspot to be generated.

In some implementations, for each processor from the plurality of processors, the resource analyzed by that processor can be a virtual machine, and the at least one additional resource identified by that processor can be at least one additional virtual machine. Additionally, for each processor, the virtual machine and the at least one additional virtual machine are each operably coupled to the load balancer associated with the indication of the load balancer retrieved by that processor. In some implementations, the first resilience data produced by at least one processor from the plurality of processors can include an indication of a first geographic location, and the second resilience data produced by the at least one processor from the plurality of processors can include an indication of a second geographic location. Additionally, the generating the indication of the vulnerability hotspot can include generating the indication of the vulnerability hotspot based on the first geographic location being less than a predetermined distance from the second geographic location.

In some implementations, the first resilience data produced by at least one processor from the plurality of processors can include an indication of a first type associated with the resource, and the second resilience data produced by the at least one processor from the plurality of processors can include an indication of a second type associated with an additional resource from the at least one additional resource. Additionally, the generating the indication of the vulnerability hotspot can include generating the indication of the vulnerability hotspot based on the first type being different from the second type. In some implementations, the plurality of processors can be configured to implement parallel computing. In some implementations, the user configuration data can include a cost threshold, and the generating the indication of the vulnerability hotspot can include generating the indication of the vulnerability hotspot based on the cloud service being associated with a plurality of resources. The plurality of resources can (1) be associated with the plurality of resource groups and (2) include fewer than a number of resources that is determined based on the cost threshold.

In some implementations, the first resilience data produced by at least one processor from the plurality of processors can include a first computer processing unit (CPU) metric associated with the resource. The second resilience data produced by the at least one processor from the plurality of processors can include a second CPU metric associated with an additional resource from the at least one additional resource. Additionally, the generating the indication of the vulnerability hotspot can include generating the indication of the vulnerability hotspot based on the first CPU metric and the second CPU metric. In some implementations, the generating the indication of the vulnerability hotspot can include generating the indication of the vulnerability hotspot based on a criticality metric included in the user configuration data. In some implementations, the generating the indication of the vulnerability hotspot can include generating the indication of the vulnerability hotspot based on an availability metric included in the user configuration data. In some implementations, the signal can further include an indication of a mitigation action based on the predetermined configuration data and the indication of the vulnerability hotspot.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory, processor-readable medium storing instructions that, when executed by a processor, cause the processor to:
based on (1) an authentication data associated with a cloud service and (2) an indication of a first resource associated with the cloud service, generate a first application programming interface (API) call to retrieve, from a database associated with the cloud service, first resource configuration data associated with the first resource;
analyze the first resource to produce first resilience data, based on the first resource configuration data, user configuration data associated with the cloud service, and predetermined configuration data associated with the cloud service;
identify a second resource associated with the cloud service and based on an indication of a load balancer associated with the cloud service;
based on the authentication data and an indication of the second resource, generate a second API call to retrieve, from the database, second resource configuration data associated with the second resource;
analyze the second resource to produce second resilience data, based on the second resource configuration data, the user configuration data, and the predetermined configuration data;
generate, based on the first resilience data and the second resilience data, an indication of a vulnerability hotspot associated with the cloud service; and
in response to generating the indication of the vulnerability hotspot, cause a signal to be generated, the signal including (1) the indication of the vulnerability hotspot and (2) an indication of a resource mitigation action based on the predetermined configuration data and the indication of the vulnerability hotspot.

2. The non-transitory, processor-readable medium of claim 1, further storing instructions to cause the processor to:
generate, based on the authentication data, a third API call associated with the cloud service to retrieve, from the database, a subscription list associated with the cloud service; and
for each subscription indication from the subscription list:
generate, based on the authentication data and that subscription indication, a fourth API call associated with the cloud service to retrieve, from the database, a resource group list associated with the cloud service, and
for each resource group indication from the resource group list, generate, based on the authentication data and that resource group indication, a fifth API call to retrieve, from the database, a resource list that is associated with the cloud service and that includes the indication of the first resource and the indication of the load balancer.

3. The non-transitory, processor-readable medium of claim 1, wherein:
the first resource is a first virtual machine;
the second resource is a second virtual machine; and
the first virtual machine and the second virtual machine are each operably coupled to the load balancer.

4. The non-transitory, processor-readable medium of claim 1, wherein:
the first resilience data includes an indication of a first geographic location;
the second resilience data includes an indication of a second geographic location; and
the instructions to generate the indication of the vulnerability hotspot include instructions to generate the indication of the vulnerability hotspot based on the first geographic location being less than a predetermined distance from the second geographic location.

5. The non-transitory, processor-readable medium of claim 1, wherein:
the first resilience data includes an indication of a first type associated with the first resource;
the second resilience data includes an indication of a second type associated with the second resource; and
the instructions to generate the indication of the vulnerability hotspot include instructions to generate the indication of the vulnerability hotspot based on the first type being different from the second type.

6. The non-transitory, processor-readable medium of claim 1, wherein:
the user configuration data includes a downtime threshold; and
the instructions to generate the indication of the vulnerability hotspot include instructions to generate the indication of the vulnerability hotspot based on the cloud service being associated with a plurality of resources that (1) includes the first resource and the second resource and (2) includes fewer than a number of resources that is determined based on the downtime threshold.

7. The non-transitory, processor-readable medium of claim 1, wherein:
the user configuration data includes a cost threshold; and
the instructions to generate the indication of the vulnerability hotspot include instructions to generate the indication of the vulnerability hotspot based on the cloud service being associated with a plurality of resources that (1) includes the first resource and the second resource and (2) includes fewer than a number of resources that is determined based on the cost threshold.

8. The non-transitory, processor-readable medium of claim 1, wherein:
the first resilience data includes a first computer processing unit (CPU) metric associated with the first resource;
the second resilience data includes a second CPU metric associated with the second resource; and
the instructions to generate the indication of the vulnerability hotspot include instructions to generate the indication of the vulnerability hotspot based on the first CPU metric and the second CPU metric.

9. The non-transitory, processor-readable medium of claim 1, wherein the instructions to generate the indication of the vulnerability hotspot include instructions to generate the indication of the vulnerability hotspot based on a criticality metric included in the user configuration data.

10. The non-transitory, processor-readable medium of claim 1, wherein the authentication data includes an authentication token associated with an authorized user of a cloud application configured to be executed by a resource of the cloud service.

11. A method, comprising:
receiving, at a plurality of processors, (1) user configuration data associated with a cloud service and (2) predetermined configuration data associated with the cloud service;
for each processor from the plurality of processors:
receiving, at that processor, an indication of a resource group different from remaining resource groups from a plurality of resource groups,
analyzing, via that processor and based on the predetermined configuration data and the indication of that resource group, a resource associated with that resource group, to produce first resilience data,
retrieving, via that processor and based on the indication of that resource group, an indication of a load balancer associated with that resource group,
identifying, via that processor and based on the indication of the load balancer, at least one additional resource, and
analyzing, via that processor and based on the predetermined configuration data and the indication of that resource group, the at least one additional resource to produce second resilience data;
generating, via an aggregation processor and based (1) the user configuration data, (2) the first resilience data received from each processor from the plurality of processors, and (3) the second resilience data received from each processor from the plurality of processors, an indication of a vulnerability hotspot associated with the cloud service; and
in response to generating the indication of the vulnerability hotspot, causing, via the aggregation processor, a signal that includes the indication of the vulnerability hotspot to be generated.

12. The method of claim 11, wherein:
for each processor from the plurality of processors:
the resource analyzed by that processor is a virtual machine;
the at least one additional resource identified by that processor is at least one additional virtual machine; and
the virtual machine and the at least one additional virtual machine are each operably coupled to the load balancer associated with the indication of the load balancer retrieved by that processor.

13. The method of claim 11, wherein:
the first resilience data produced by at least one processor from the plurality of processors includes an indication of a first geographic location;
the second resilience data produced by the at least one processor from the plurality of processors includes an indication of a second geographic location; and
the generating the indication of the vulnerability hotspot includes generating the indication of the vulnerability hotspot based on the first geographic location being less than a predetermined distance from the second geographic location.

14. The method of claim 11, wherein:
the first resilience data produced by at least one processor from the plurality of processors includes an indication of a first type associated with the resource;
the second resilience data produced by the at least one processor from the plurality of processors includes an indication of a second type associated with an additional resource from the at least one additional resource; and
the generating the indication of the vulnerability hotspot includes generating the indication of the vulnerability hotspot based on the first type being different from the second type.

15. The method of claim 11, wherein the plurality of processors is configured to implement parallel computing.

16. The method of claim 11, wherein:
the user configuration data includes a cost threshold; and
the generating the indication of the vulnerability hotspot includes generating the indication of the vulnerability hotspot based on the cloud service being associated with a plurality of resources that (1) is associated with the plurality of resource groups and (2) includes fewer than a number of resources that is determined based on the cost threshold.

17. The method of claim 11, wherein:
the first resilience data produced by at least one processor from the plurality of processors includes a first computer processing unit (CPU) metric associated with the resource;
the second resilience data produced by the at least one processor from the plurality of processors includes a second CPU metric associated with an additional resource from the at least one additional resource; and
the generating the indication of the vulnerability hotspot includes generating the indication of the vulnerability hotspot based on the first CPU metric and the second CPU metric.

18. The method of claim 11, wherein the generating the indication of the vulnerability hotspot includes generating the indication of the vulnerability hotspot based on a criticality metric included in the user configuration data.

19. The method of claim 11, wherein the generating the indication of the vulnerability hotspot includes generating the indication of the vulnerability hotspot based on an availability metric included in the user configuration data.

20. The method of claim 11, wherein the signal further includes an indication of a mitigation action based on the predetermined configuration data and the indication of the vulnerability hotspot.

* * * * *